(No Model.)
J. BALLARD.
SPADE.
No. 432,472.  Patented July 15, 1890.
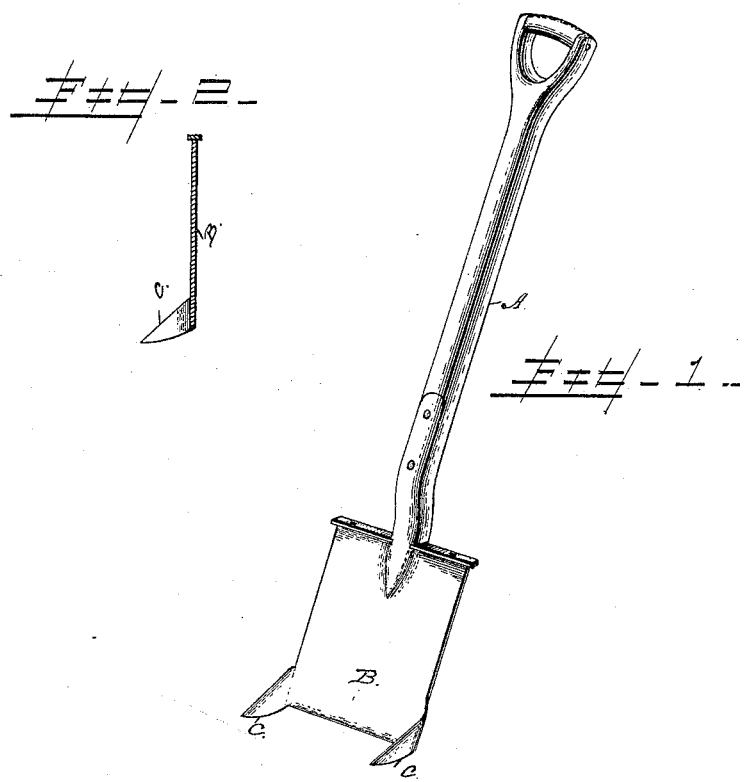
Witnesses
Jos H Blackwood
Albert B. Blackwood
Inventor
John Ballard
by Smith & Clayott
Attorneys

UNITED STATES PATENT OFFICE.

JOHN BALLARD, OF DUNKIRK, OHIO.

SPADE.

SPECIFICATION forming part of Letters Patent No. 432,472, dated July 15, 1890.

Application filed January 21, 1890. Serial No. 337,572. (No model.)

*To all whom it may concern:*

Be it known that I, JOHN BALLARD, a citizen of the United States, residing at Dunkirk, in the county of Hardin and State of Ohio, have invented certain new and useful Improvements in Spades; and I do declare the following to be a full, clear, and exact description of the invention, such as will enable others skilled in the art to which it appertains to make and use the same.

My invention relates to certain new and useful improvements in spades; and the nature of the invention will be understood from the following description when taken in connection with the accompanying drawings, in which—

Figure 1 is a view in perspective of a spade with my improvements applied, and Fig. 2 a longitudinal section through the blade thereof.

In the drawings, A represents the handle and B the blade of an ordinary ditching-spade, the two being connected in any suitable manner.

At the lower or forward end of blade B and upon each side edge thereof I provide knives C, which are preferably turned up from the same sheet of metal from which the blade is formed. These knives, as shown, extend up a suitable distance above the top face of the blade, and are adapted to cut the side edges of the excavation to be made by the spade. Each knife C is of the form shown in the drawings, wherein they are represented as being broader at their base than at their upper ends, the back or top edge of each being inclined to form an acute angle to the blade, and the lower or front edge being curved, as shown. Both edges of the knives are sharpened, so as to enable them to cut clearly and easily.

By the use of a spade constructed as described the sides of a ditch are cut clean at a single stroke of the spade, and when a root is encountered, if on the downward stroke, it is severed by the lower or forward cutting-edges of the knives; but should such root strike too near the upper end of the knife the withdrawal of the spade will cause the upper edge of the knife to cut it. The curve on the lower edges of the knives allows them to ride over the roots readily, and the incline in the upper edges allows of the cutting of the roots as the spade is withdrawn.

What I claim is—

The improved spade herein described and shown, consisting of the blade B, having the integral forwardly-projecting knives C C at its lower corners, the upper edges of said knives being straight and inclined downwardly, while their lower edges are curved, both edges being sharpened, as set forth.

In testimony whereof I affix my signature in presence of two witnesses.

JOHN BALLARD.

Witnesses:
 OREN SWETLAIN,
 E. M. CRAWFORD.